(12) United States Patent
Duerr

(10) Patent No.: US 8,167,449 B2
(45) Date of Patent: May 1, 2012

(54) INSPECTION LAMP WITH INTERCHANGEABLE LED LIGHT SOURCE MODULE

(75) Inventor: John Duerr, Massapequa Park, NY (US)

(73) Assignee: Spectronics Corporation, Westbury, NY (US)

( * ) Notice: Subject to any disclaimer, the term of this patent is extended or adjusted under 35 U.S.C. 154(b) by 246 days.

(21) Appl. No.: 12/619,354

(22) Filed: Nov. 16, 2009

(65) Prior Publication Data

US 2010/0060197 A1 Mar. 11, 2010

Related U.S. Application Data

(63) Continuation of application No. 12/454,983, filed on May 26, 2009, now abandoned.

(60) Provisional application No. 61/130,255, filed on May 28, 2008.

(51) Int. Cl.
*B25B 23/18* (2006.01)

(52) U.S. Cl. ............. 362/120; 362/249.02; 362/249.05; 362/311.02; 362/555; 362/800

(58) Field of Classification Search ................. 362/120, 362/223, 227, 230–231, 253, 311.01–311.02, 362/551, 555, 558, 577, 800, 249.02, 249.05

See application file for complete search history.

(56) References Cited

U.S. PATENT DOCUMENTS

| | | | | |
|---|---|---|---|---|
| 5,909,952 A | * | 6/1999 | Guthrie et al. | 362/205 |
| 6,364,504 B1 | * | 4/2002 | Hon | 362/208 |
| 6,767,110 B2 | | 7/2004 | Cooper et al. | |
| 7,293,893 B2 | * | 11/2007 | Kim | 362/205 |

* cited by examiner

*Primary Examiner* — Stephen F Husar
*Assistant Examiner* — Meghan Dunwiddie
(74) *Attorney, Agent, or Firm* — Drinker Biddle & Reath LLP

(57) ABSTRACT

An inspection lamp includes a housing with an external opening providing access to a socket having an electrical contact, an interchangeable light source module including a tab adapted to be inserted into the opening and received into the socket, the tab including a mating electrical contact for making an electrical connection with the electrical contact of the socket, the light source module including at least one light emitting diode, and a switch for controlling the light emitted by the light source module.

15 Claims, 6 Drawing Sheets

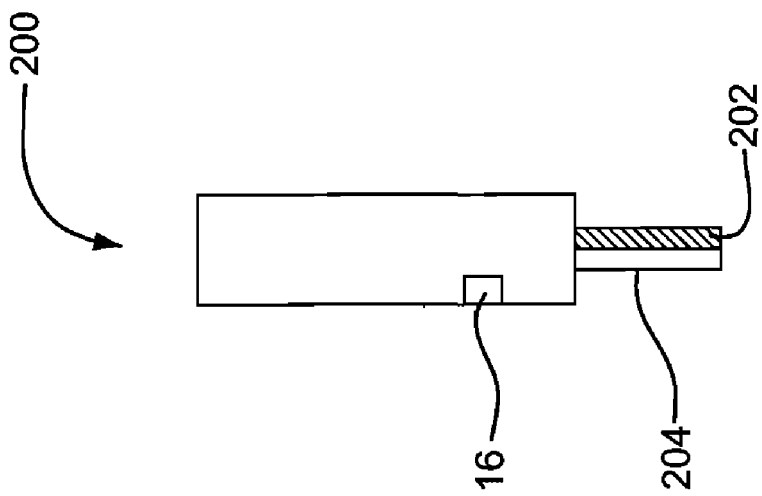
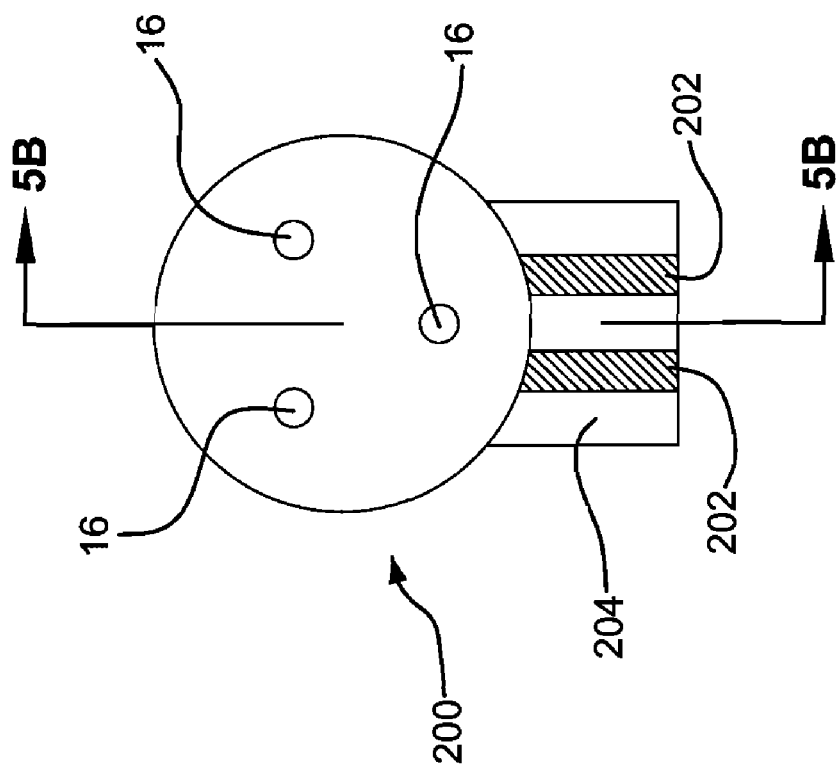
FIG. 5B
FIG. 5A

INSPECTION LAMP WITH INTERCHANGEABLE LED LIGHT SOURCE MODULE

RELATED APPLICATION

This application is a continuation-in-part of U.S. patent application Ser. No. 12/454,983, filed May 26, 2009, and claims priority from U.S. Provisional Application No. 61/130,255, filed May 28, 2008, each of which is incorporated herein by reference in its entirety.

TECHNICAL FIELD

The application relates to inspection lamps, and especially to an inspection lamp for exciting fluorescent dyes.

BACKGROUND

Fluorescence is a phenomenon in which a substance absorbs light, and almost immediately re-radiates light of a longer wavelength. Fluorescent dyes have been created for use in detecting leaks from fluid containing systems. In use, a fluorescent dye is included in the fluid within the system. A region outside of the system, such as where a leak is suspected, is illuminated with light that has a wavelength that will excite the fluorescent dye. The area being illuminated is inspected for emission from the fluorescent dye. Fluorescent dyes used for this purpose are usually excited by light in the blue to ultraviolet wavelength range, and emit visible light in the green to yellow wavelength range.

Inspection lamps with different wavelength outputs are becoming more popular in many different industrial applications such as leak detection, forensic inspections, and non-destructive testing. Therefore, it is desirable to have one lamp that can provide many different colors of light upon demand. Prior lamps have met this need by using replaceable filters to block undesired colors of light and to transmit only the desired color of light, by using multiple lamp heads each with a different color or colors, by using color wheels, or by using complicated assemblies containing various bulbs or LEDs.

SUMMARY

In one embodiment, an inspection lamp is provided. The lamp includes a housing including an external opening providing access to a socket having an electrical contact, an interchangeable light source module including a tab adapted to be inserted into the opening and received into the socket, and a switch for controlling the light emitted by the light source module. The tab includes a mating electrical contact for making an electrical connection with the electrical contact of the socket, the light source module including at least one light emitting diode.

In another embodiment, an inspection lamp is provided having an elongate housing, an external opening disposed at an end of the housing, the external slot providing access to a corresponding electrical socket, and a reflector mounted in the housing adjacent to the socket. An interchangeable light source module is insertable through the external slot and engageable with the electrical socket, the light source module including a light source, a tab adapted for receipt in the socket so as to make an electrical connection between a contact in the socket and a mating contact on the tab, and circuitry interconnecting the light source to the contact on the tab. Light emitted by the light source is reflected by the reflector and emitted from an opening in the housing.

In another embodiment, an inspection lamp kit is provided including a housing having a reflector, an opening, and slot providing access to a socket including an electrical contact, a first light source module including one or more light emitting diodes that emit light in a first wavelength range and circuitry interconnecting the light emitting diodes to an electrical contact on a tab adapted to be removably received in the socket, and a second light source module including one or more light emitting diodes that emit light in a second wavelength range that is different from the first wavelength range and circuitry interconnecting the light emitting diodes to an electrical contact on a tab adapted to be removably received in the socket. When one or the other of the first light source module and the second light source module is mounted in the lamp via the slot with the tab removably received in the socket, light emitted by said light source module is directed by the reflector toward the opening in the housing. The light source modules are interchangeable in the lamp socket so as to allow for changing the light wavelength range emitted by the lamp by switching the light source modules.

In another embodiment, an interchangeable light emitting diode module is provided for an inspection lamp. The module includes at least one light emitting diode and electrical contacts corresponding to the at least one light emitting diode, the electrical contacts being adapted for engagement with mating electrical contacts in the lamp.

In another embodiment, an inspection lamp, is provided including an elongate housing, a light dispersing rod having two ends and mounted within the housing, two electrical socket disposed in the housing, one electrical socket at each end of the rod, and an interchangeable light source module corresponding to each electrical socket. Each light source module includes a tab adapted for receipt in the socket so as to make an electrical connection between a contact in the socket and a mating contact on the tab. The light source module includes one or more light emitting diodes configured to emit light into one of the ends of the rod. The housing has a longitudinal opening along a portion thereof and a longitudinal reflector opposite the opening, and the light dispersing rod is mounted such that at least a portion of the rod is exposed via the opening. The light emitted by the light emitting diodes is dispersed by the rod and directed by the reflector toward the opening.

BRIEF DESCRIPTION OF THE DRAWINGS

The above and other aspects, features and advantages of the present invention will be more apparent from the following more particular description thereof, presented in conjunction with the following drawings wherein:

FIG. 5A is an elevation view of an exemplary interchangeable LED light source module.

FIG. 5B is a cross-sectional view of the interchangeable LED light source module of FIG. 5A, taken through section 5B-5B of FIG. 5A.

DETAILED DESCRIPTION

Figure 1:
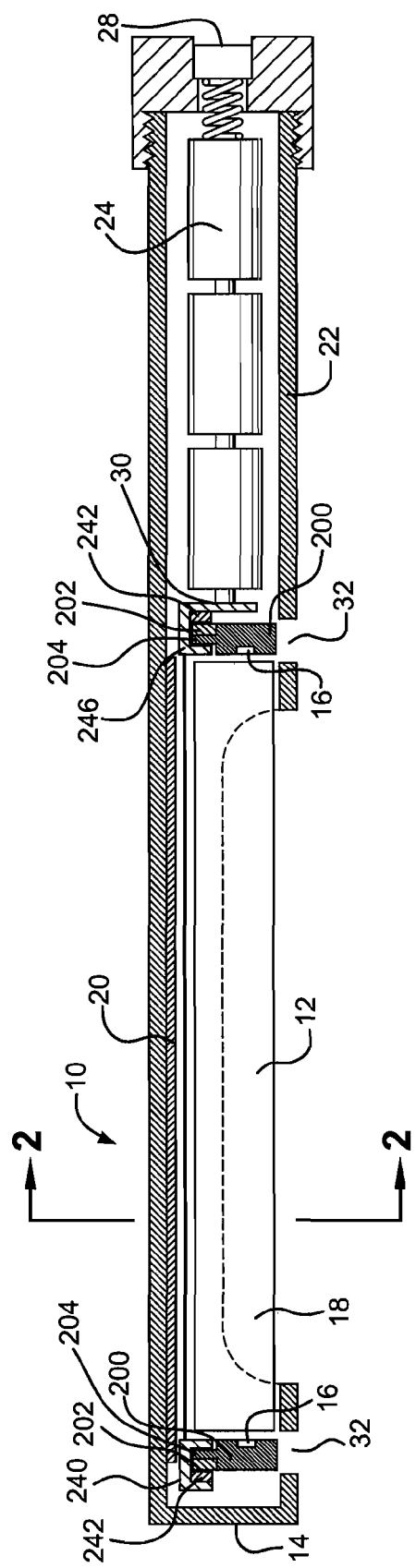
FIG. 1 is a longitudinal cross-sectional view of an embodiment of an inspection lamp including interchangeable LED light source modules.
Figure 2:
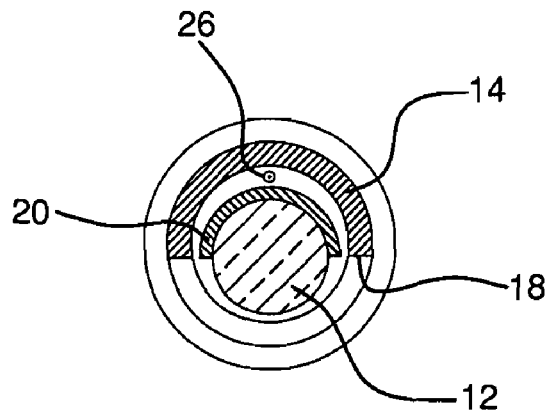
FIG. 2 is a cross-sectional view of the lamp shown in FIG. 1, taken through section 2-2 in FIG. 1.
Figure 3:
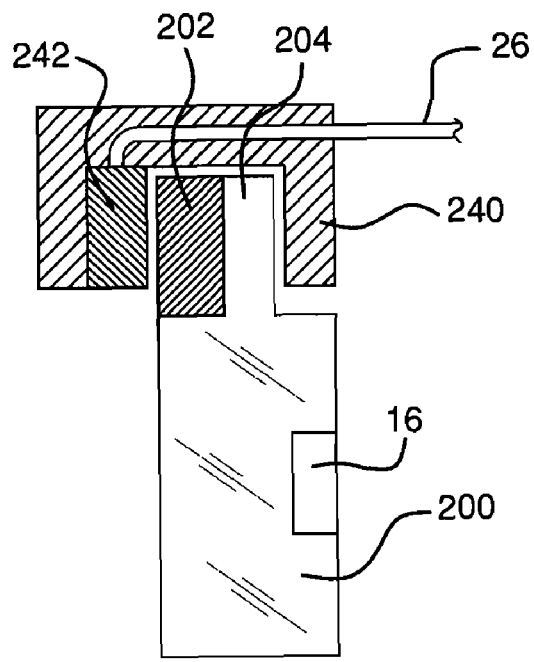
FIG. 3 is an expanded view of a socket and tab mounting arrangement for an interchangeable LED light source module of the embodiment of FIG. 1.
Figure 4:
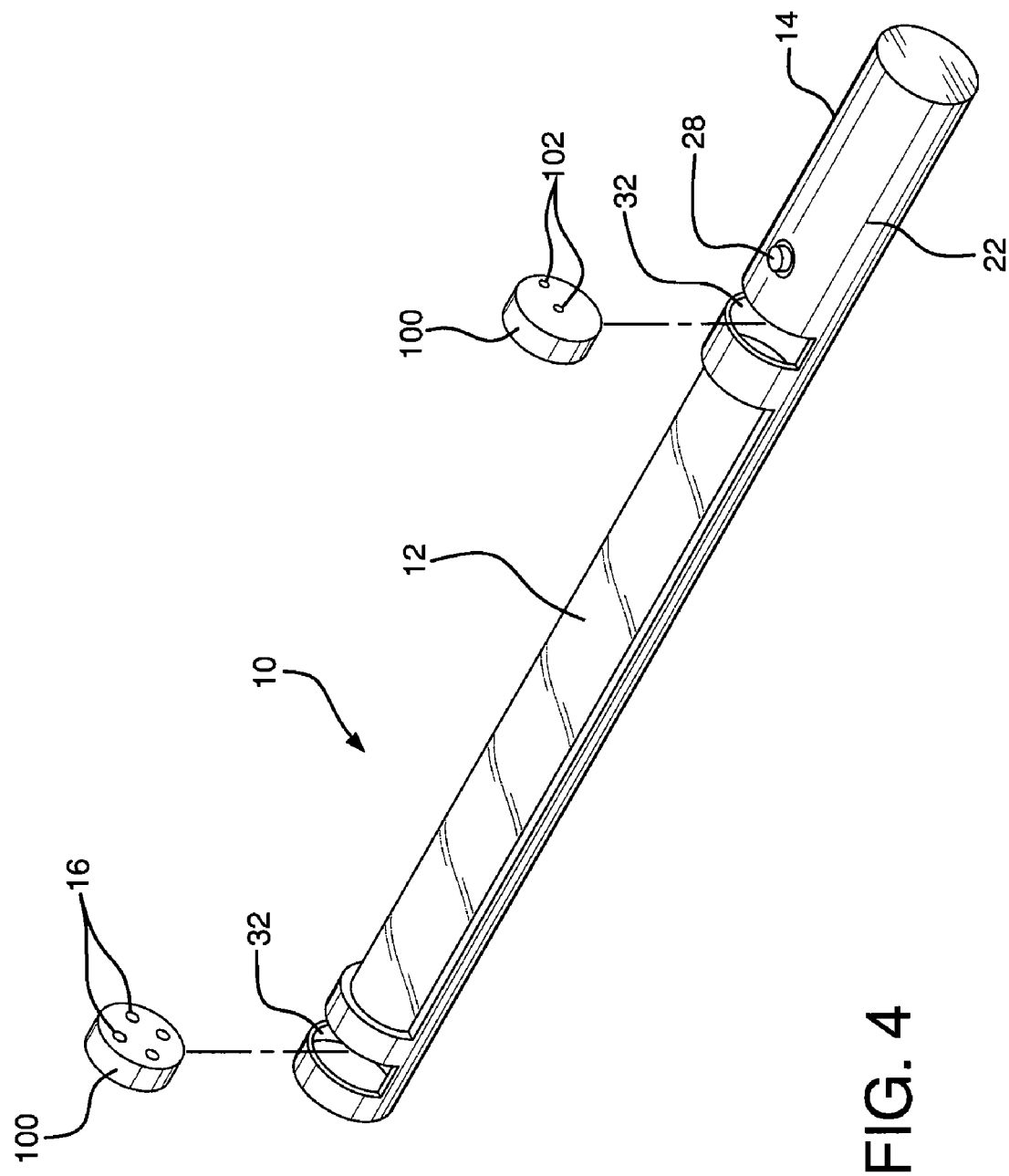
FIG. 4 is a partially exploded perspective view of an embodiment of an inspection lamp with interchangeable LED light source modules.

Referring to FIGS. 1-3, an embodiment of an inspection lamp 10 is depicted. The lamp 10 includes a light-dispersing rod 12 mounted within a generally tubular housing 14. The rod 12 can be transparent, semi-transparent, or translucent. At least one light emitting diode (LED) 16 is mounted within the housing 14 at an end of the rod 12, the LED being positioned to emit light into the rod 12. In the depicted embodiment, two light emitting diodes (LEDs) 16 are mounted within the housing 14, one at each end of the rod 12, each LED being positioned to emit light into the rod 12. It is understood that a plurality of LEDs can be clustered together at either end of the rod 12 or that one or more LEDs can be positioned along the side of the rod 12. The LEDs 16 may be mounted separately, in an LED module 100 as shown in FIG. 4, or in an LED module 200 as shown in FIGS. 1-3 and 5A-5B.

The LEDs 16 can be selected to have a desired spectral output optimized for an intended use of the lamp 10. For example, when the lamp 10 is intended as an inspection lamp for fluorescence leak detection, the LEDs 16 may be selected to emit light strongly at or near an excitation frequency of a fluorescent dye, or in a wavelength range including the excitation frequencies of a various of fluorescent dyes. Fluorescent dyes used in leak detection typically have excitation frequencies in the blue, violet, near ultraviolet, and ultraviolet (UV) regions of the spectrum, such that the excitation frequency range may include wavelengths of light in the UV-A, UV-B, or UV-C ranges. Alternatively, white or broad-spectrum LEDs may be used with or without appropriate filtration; without filtration, the use of LEDs that emit significant amounts of light at wavelengths of fluorescence of the dyes (i.e., typically in the yellow or green wavelength ranges) may make the fluorescence more difficult to see.

In the depicted embodiments, the rod 12 is generally cylindrical with a generally circular cross-section. The rod 12 can be made from quartz, glass, acrylic, plastic, or other suitable material, depending on the spectral output from the LEDs 16. The material of the rod 12 can be chosen to act as a waveguide and to have a low absorption of the desired light emitted by the LEDs 16. Alternatively, the material of the rod 12 can be chosen to diffuse or scatter the light to a significant extent. The coupling between the LEDs 16 and the rod 12 may be designed in accordance with established optical principles and practices to ensure efficient light transfer from the LEDs 16 to the rod 12. In one embodiment, the LEDs 16 are placed at either end of the rod 12 and oriented so as to emit light into the rod 12 at each end thereof.

The tubular housing 14 is arranged to support both ends of the rod 12 and to cover and protect the LEDs 16. An elongate opening 18 is formed in a portion of the housing 14 between its ends and extends along a side of the rod 12. In one embodiment, the opening 18 spans approximately half the circumference of the housing 14 and almost the entire length of the rod 12. For robustness and ease of construction, the housing 14 may be made of metal or plastic.

Within the housing 14, opposite the opening 18, a reflector 20 is provided between the rod 12 and the housing 14. The reflector 20 includes a reflective coating, such as a white or mirrored coating, on an inside surface of the housing 14 or on an outside surface of the rod 12. Alternatively, the reflector 20 may include a sheet or layer of a white or white-coated material, such as plastic or metal, that partly surrounds the rod 12 opposite the opening 18. In situations in which only a narrow spectral band of light emitted from the LEDs 16 is to be used, the reflector 20 may be of a color that absorbs light of other wavelengths. However, unless it is desirable to actively suppress unneeded wavelengths, a white or mirrored material or coating may be simpler and more economical. Also, a reflective coating will absorb less heat than an absorptive coating or material, which may be important if high-power LEDs 16 are used.

A guard may be provided over the opening 18 to protect the rod 12. In one embodiment, where the rod 12 is made from solid plastic and is therefore quite robust and durable, a guard over the opening 18 is usually not necessary; minor surface scratches typically will not materially impair the operation of a lamp 10 including such a rod 12. Nevertheless, a sliding or hinged cover (not shown) could be added to cover the opening 18 when the lamp 10 is not in use.

In the depicted embodiment, the housing 14 extends beyond the rod 12 at one end and includes a handle 22 that can be used to grasp the lamp 10. The handle 22 may be formed integrally with the housing 22 or separately attached such as with threads. Batteries 24 within the handle 22 provide a power source for the lamp 10. The tubular handle 22 provides a suitable space for a plurality of conventional cylindrical dry cells 24 placed end to end. Other power sources may be used instead, including but not limited to a rechargeable battery pack and a power cord connected to an external power supply. Power can be transmitted from the batteries 24 to the LEDs 16 by one or more electrical conductors or wires 26 within the housing 14. When a conductive housing 12 is used, such as a metal housing, the housing 12 itself can serve as the electrical ground conductor in the power circuit, and a single conductor 26 can be routed to each LED 16 or LED module 100, 200. Alternatively, if a nonconductive (e.g., plastic) housing 12 is used, two conductor 26 can be routed to each LED 16 or LED module 100, 200.

The lamp 10 includes a control switch 28 for activating or deactivating the LEDs 16. The switch 28 may also control the mode of operation of the lamp 10. The switch 28 can be a conventional switch known in the art. In one embodiment, the switch 28 is recessed in the end of the handle 22 as shown in FIG. 1. Other circuitry 30 (not shown in detail) may be provided as desired. For example, many commonly available high-brightness LEDs have a voltage drop of approximately 3.5 volts. When such LEDs are powered by conventional dry cells with a nominal voltage of 1.5 volts, two cells in series do not provide sufficient voltage to produce the full light output of the LEDs, while three cells in series provide an excessive voltage that can shorten the life of the LEDs and waste power. Therefore, the circuitry 30 may limit, regulate, and/or boost the voltage and/or current supplied to the LEDs 16 or LED modules 100, 200, depending on the specific choice of power source and LEDs. Alternatively, in the interests of simplicity and robustness, the circuitry 30 may be omitted, and any consequent reduction in performance may be accepted.

In use, when the switch 28 is actuated to an ON position, the batteries 24 supply power to the LEDs 16 or LED modules 100, 200, which emit light into the ends of the rod 12; when the switch 28 is actuated to an OFF position, power from the batteries 24 is disconnected from the LEDs 16 or LED modules 100, 200. The light emitted by the LEDs 16 is scattered by the material of the rod 12, and reflected by the reflector 20, which directs light to the side of the rod 12 corresponding with the opening 18 in the housing 14. The combination of the opening 18 in the housing 14 and the reflector 20 provides for dispersion of the light along the length of the rod 12 and over an angle bounded by the opening 18.

In one embodiment, the lamp 10 includes a rod 12 of approximately ½ inch diameter having a length of approximately ten inches exposed through the opening 18. The light emitted from the lamp 10 onto a surface positioned about six inches away illuminates an area about 24 inches long and 11 inches wide, including a region of highly concentrated light in the center. The concentrated central region results from partial masking of light from the rod 12 by the housing 14 combined with focusing of light from the reflector 20 by the curved surface of the rod 12. The concentrated light output results in almost all of the light being concentrated in a rectangular beam spanning an angle of 90° with respect to the longitudinal axis of the rod 12. And although it might be expected that the light intensity would diminish away from the LEDs 16 or LED modules 100, 200 towards the middle of the rod 12, the injection of light at both ends of the rod 12, combined with redistribution resulting from multiple scattering of the light before it is emitted through the opening 18, produces a surprisingly even distribution with no noticeable unevenness or hot spots along the length of the rod 12.

In one exemplary embodiment, the inspection lamp 10 as depicted in FIG. 1 has an overall length of about 18.5" (47 cm) and includes a rod 12 having a length of about 12" (30 cm) long and a diameter of about 0.55" (14 mm). The housing 14 is about 1.2" (3 cm) in diameter. The opening 18 in the housing 14 exposes about 10" (25 cm) of the rod 12, so that about 1" (2.5 cm) of the rod 12 is recessed into the housing 14 at each end. The handle 22 is about 1.2" (3 cm) in diameter, or about the same diameter as the housing 14, for comfort in use and to accommodate standard "C" cells, which are about 1" (2.5 cm) in diameter.

As shown in FIG. 4, the light source at each end of the rod 12 can be in the form of a replaceable LED module 100. The module 100 can include one or more LEDs 16. The LED module 100 can include a plurality of LEDs 16 on one face and electrical contacts 102 on the same face or on an opposite face. The LED module 100 is inserted through an externally accessible slot or opening 32 in the housing 14, enabling one LED module 100 to be interchanged with another LED module 100 without having to disassemble any portions of the lamp 10.

Alternatively, in the exemplary LED module 200 shown in FIGS. 1-3 and 5A-5B, a plurality of LEDs 16 are mounted on one face of the module 200 while a connecting tab 204 having electrical contacts 202 extends outwardly from an edge of the module 200. As shown particularly in FIG. 3, the connecting tab 204 is adapted to be removably received in a connecting socket 240 having mating electrical contacts 242 positioned to match the electrical contacts 202 on the tab 204; the tab 204 secures the module 200 in the socket 240 and ensures electrical connection between the contacts 202 and the contacts 242, in much the way a computer or electronics board or chip mounts into a motherboard socket. The LED module 200 can be inserted into and removed from the socket 240 through an opening or slot 32 in the housing 14, as shown in FIG. 1. The LED module 100, 200 can include a heat sink to dissipate heat generated by the LEDs 16. In addition, or alternatively, a fan can be provided to improve air movement and heat dissipation from the LEDs 16. A cover (not shown) may be provided for each of the openings 32 to secure the module 200 in the rod 12. The tab 204 and the socket 240 may alternatively be constructed as a USB or firewire connection.

In one embodiment, the LED module 200 includes multiple LEDs 16 that are powered by a single set of contacts 202 and illuminate together to provide a maximum intensity of light. In another embodiment, the LED module 200 includes multiple LEDs 16 that can be illuminated separately or together in any combination as controlled by the circuitry 30, each LED 16 having its own set of electrical contacts 202.

All of the LEDs 16 in the module 200 can be of the same color (i.e., each LED emits approximately the wavelength or wavelength range of light), each LED 16 in the module 200 can be of a different color, or the LEDs 16 in the module 200 can be a combination of the same and different colors. For example, the module 200 can include one or more LEDs in any combination. The LEDs can be selected from a group including, but not limited to, a white LED, a UV LED, a UV-A LED, a UV-B LED, a UV-C LED, a blue LED, a green LED, an amber LED, a red LED, or an LED of any other color in the UV, visible, or infrared ranges.

The switch 28 can be configured to allow a user to select the intensity and/or the color combination of illumination desired. In one embodiment, the circuitry 30 can be configured to cycle through a sequence of different groupings of the LEDs 16 upon successive depressions of the switch 28. Accordingly, the lamp 10 can be arranged to emit one, some, or all of the wavelengths available to be provided by the individual LEDs 16, and/or to emit light having the intensity of only one, or more than one, of the LEDs. Any combination of the LEDs can be illuminated, including to provide or simulate colors not present in the individual LEDs themselves. For example, instead of providing an amber LED, green LED and a red LED can be illuminated simultaneously to produce a light that will be perceived to be amber. Further, red, blue, and green LEDs can be illuminated simultaneously to produce visible light having a sufficiently broad spectrum to eliminate the need for a separate white LED.

In addition, interchangeable LED modules 100, 200 can be provided, each having LEDs 16 that emit different wavelengths of light, or combinations of wavelengths, that may be desired for particular applications. An LED module 100, 200 can be readily removed from the lamp 10 through the opening 32 and another LED module 100, 200 having a differently colored LED 16 or combination of LEDs 16 can be inserted into lamp 10 through the opening 32. In this manner, the same lamp 10, using the same housing 14, rod 12, power source 24, switch 28, and optional circuitry 30 can provide an unlimited variation of light wavelengths and intensities by simply interchanging the LED module(s) 100, 200. Further, because the LEDs 16 are the most delicate components of the lamp 10, the LED module 100, 200 allows damaged LEDs 16 to be readily replaced without incurring the expense of a new lamp 10. Also, as new, higher intensity or differently colored LEDs 16 are developed in the future, such LEDs can be included in an LED module 100, 200 and used in the existing lamp 10.

Figure 8:
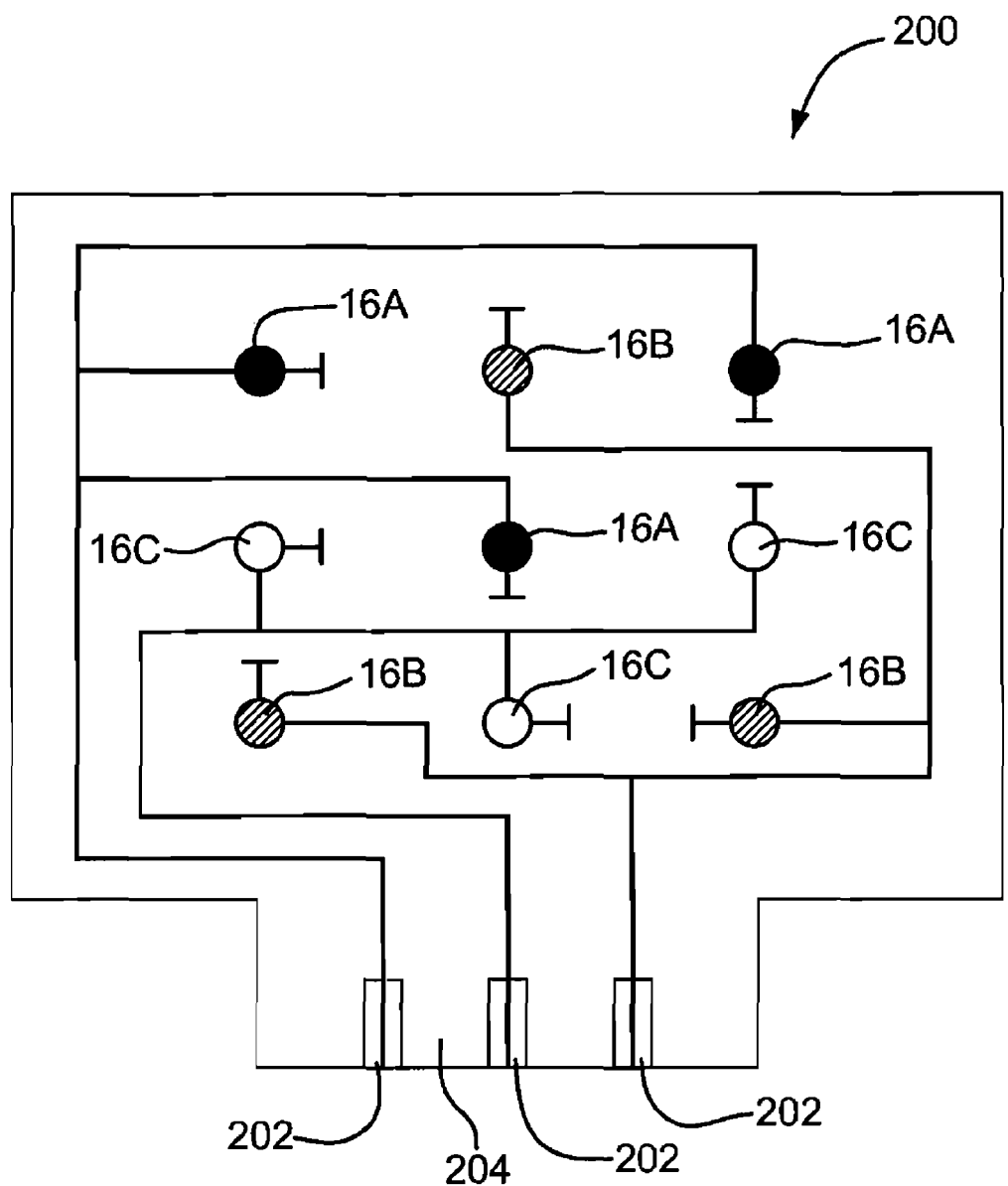
FIG. 8 is a front view of an exemplary interchangeable LED light source module.

In one embodiment, as shown in FIG. 8, the LED module 200 can be in the form of a printed circuit board including a plurality of LEDs mounted thereon. As shown, the LED module 200 includes three sets of three differently colored LEDs 16A, 16B, 16C, each routed to a separate electrical contact 202, so that the differently colored LEDs 16A, 16B, 16C can be activated either separately or in combination.

While the combined housing 14 and the rod 12 depicted in the figures is formed a straight cylinder, it is also contemplated that the combined housing 14 and the rod 12 may have a different shape, such as curved, so as to permit the shape of the illumination to be tailored for specific applications. In one example, for inspection of piping, a curved rod and housing may be desirable to provide consistent and directed illumination around the circumference of the pipe. In another example, for use in a head mounted lamp, a shorter, larger diameter rod and housing may be desirable.

Figure 6:
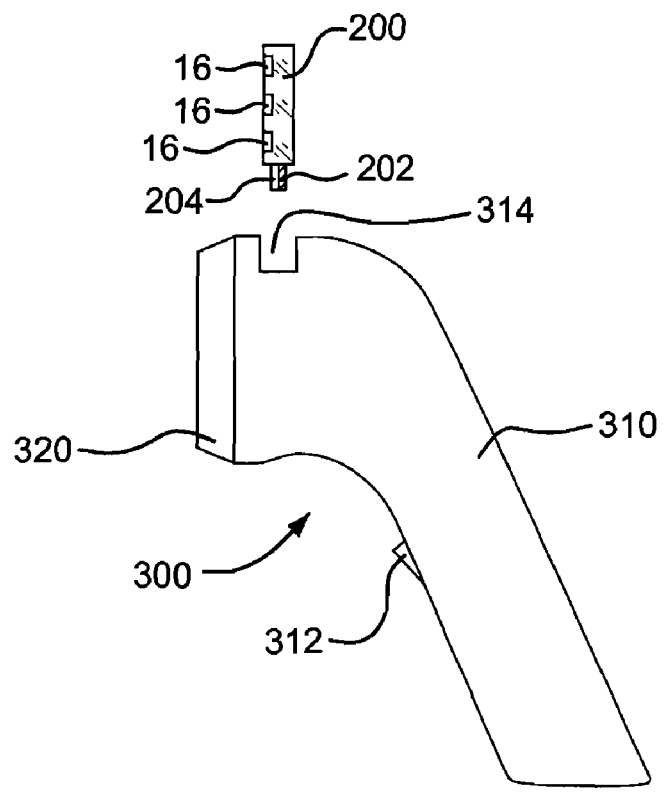
FIG. 6 is an exploded side view of an embodiment of an inspection lamp.
Figure 7:
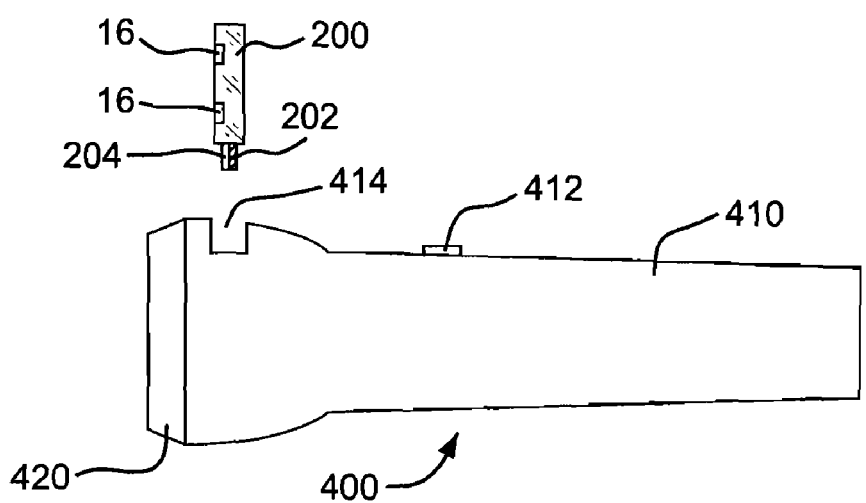
FIG. 7 is an exploded side view of an embodiment of an inspection lamp.

In other examples, as shown in FIGS. 6 and 7, a flashlight 300 having a pistol-grip housing 310 and a cover 320, or a flashlight 400 having a cylindrical housing 410 and a cover 420, respectively, can be adapted to receive a light source module 200. In particular, each housing 310 and 410 includes an externally accessible slot or opening 314 and 414, respectively, to enable insertion of or removal of a light source module 200. The light source module 200 includes a tab 204 having electrical contacts 202, and one or more light emitting diodes 16. Each lamp 300 and 400 includes a mating socket (not shown) adapted to removably receive the tab 204 of the light source module, and having contacts for engaging the contacts 202 on the light source module 200. The light source module 200 is activated and controlled by actuating a switch 312 or 412, respectively. Additionally, the lamp can incorporate light guides to direct light from the rod to an area of desired illumination.

Although specific embodiments have been described, the skilled artisan will understand how various modifications may be made within the scope of the present invention, which is defined by the attached claims.

The invention claimed is:

1. An inspection lamp, comprising:
   a housing including an external slot providing access to a socket having an electrical contact;
   an interchangeable light source module including a face and a tab adapted to be inserted into the slot and received into the socket, the tab including a mating electrical contact for making an electrical connection with the electrical contact of the socket, the light source module including at least one light emitting diode positioned to emit light predominantly away from the plane of the face; and
   a switch for controlling the light emitted by the light source module.

2. The inspection lamp of claim 1, further comprising:
   circuitry for controlling the color of the light emitted by the light source module.

3. The inspection lamp of claim 1, wherein the light source module includes a plurality of light emitting diodes.

4. The inspection lamp of claim 3, wherein at least one of the plurality of light emitting diodes emits light in a first wavelength range and at least one of the plurality of light emitting diodes emits light in a second wavelength range.

5. The inspection lamp of claim 4, wherein at least one of the plurality of light emitting diodes emits light in a third wavelength range.

6. An inspection lamp, comprising:
   an elongate housing;
   an external slot disposed at an end of the housing, the external slot providing access to a corresponding electrical socket;
   a reflector mounted in the housing adjacent to the socket; and
   an interchangeable light source module insertable and removable through the external slot without displacing the reflector and engageable with the electrical socket, the light source module including a light source, a tab adapted for receipt in the socket so as to make an electrical connection between a contact in the socket and a mating contact on the tab, and circuitry interconnecting the light source to the contact on the tab;
   wherein the engagement of the module with the socket positions the light source within the reflector, and wherein the light emitted by the light source is reflected by the reflector and emitted from an opening in the housing other than said slot.

7. The inspection lamp of claim 6, wherein the light source includes at least one light emitting diode.

8. The inspection lamp of claim 6, wherein the light source includes a plurality of light emitting diodes.

9. The inspection lamp of claim 8, wherein the light source includes at least one first light emitting diode that emits light of a first color and at least one second light emitting diode that emits light of a second color, the inspection lamp further comprising a switch for controlling the color of the light emitted by the light source.

10. The inspection lamp of claim 8, wherein the light source includes at least one first light emitting diode that emits light of a first color and at least one second light emitting diode that emits light of a second color, the inspection lamp further comprising circuitry for controlling the color of the light emitted by the light source by activating one or more of the first and second light emitting diodes.

11. The inspection lamp of claim 8, further comprising a switch for controlling the intensity of the light emitted by the light source module.

12. The inspection lamp of claim 8, further comprising circuitry for controlling the intensity of the light emitted by the light source module.

13. An inspection lamp kit comprising:
   an inspection lamp including a housing, the housing having a reflector, an opening, and slot separate from said opening providing access to a socket including an electrical contact;
   a first light source module adapted to be inserted into and removed from the slot without displacing the reflector and including one or more light emitting diodes that emit light in a first wavelength range and circuitry interconnecting the light emitting diodes to an electrical contact on a tab adapted to be removably received in the socket;
   and a second light source module adapted to be inserted into and removed from the slot without displacing the reflector and including one or more light emitting diodes that emit light in a second wavelength range that is different from the first wavelength range and circuitry interconnecting the light emitting diodes to an electrical contact on a tab adapted to be removably received in the socket;
   wherein when one or the other of the first light source module and the second light source module is mounted in the lamp via the slot with the tab removably received in the socket, light emitted by said light source module is directed by the reflector toward the opening in the housing; and
   wherein the light source modules are interchangeable in the lamp socket so as to allow for changing the light wavelength range emitted by the lamp by switching the light source modules.

14. The inspection lamp of claim 6, wherein the light source module is flat, and is received within a flat space between the slot and the socket, and the light source is mounted on the module so as to emit light predominantly perpendicular to the plane of the flat module.

15. The inspection lamp kit of claim 13, wherein the first and second light source modules are flat, the operative module is received within a flat space between the slot and the socket, and the light emitting diodes are mounted on the modules so as to emit light predominantly perpendicular to the plane of the respective flat module.

* * * * *